Figure 1:
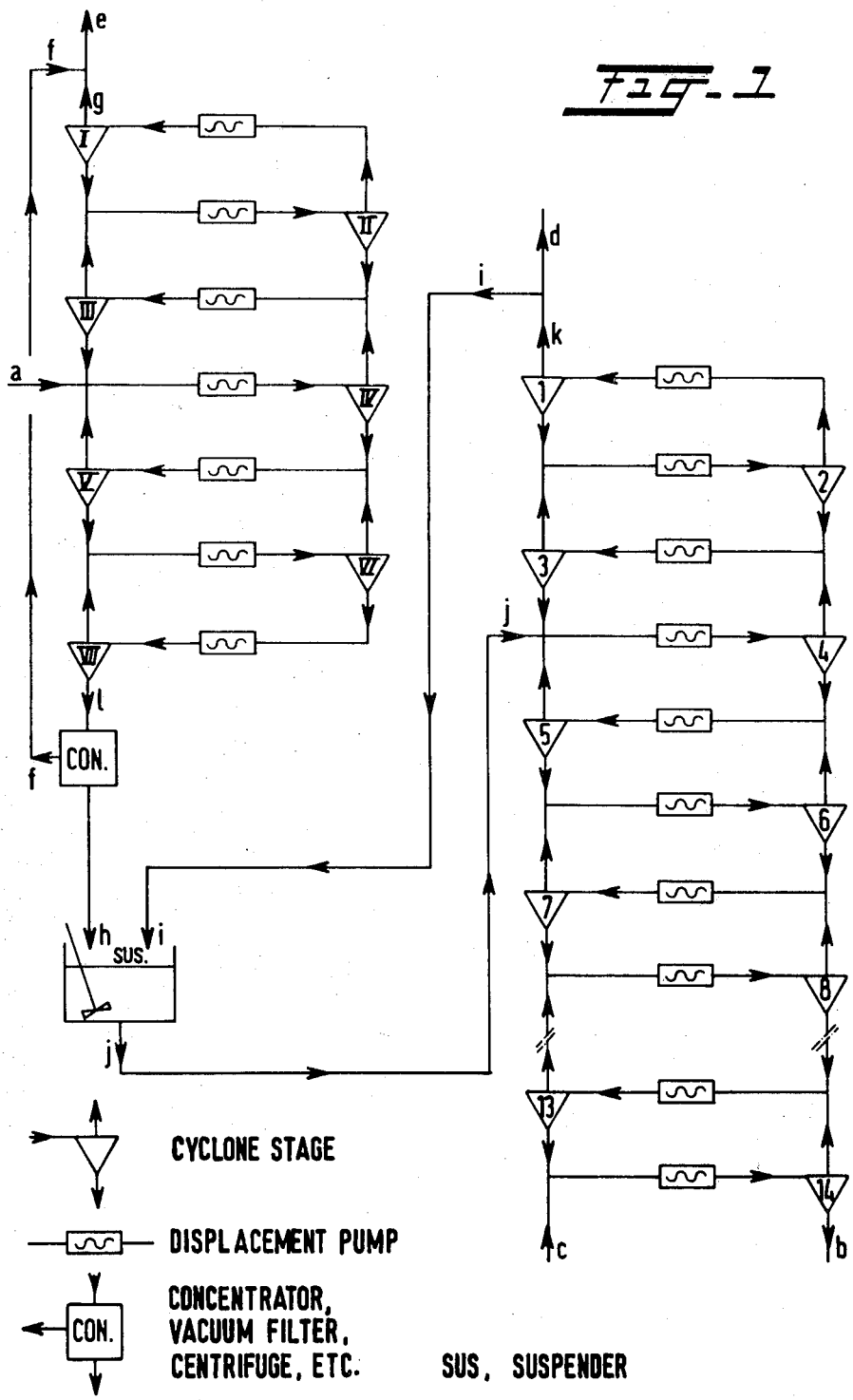

United States Patent [19]
Verberne

[11] 3,890,888
[45] June 24, 1975

[54] METHOD AND APPARATUS FOR THE RECOVERY OF NON-DILUTED OR LITTLE DILUTED JUICE AND OF STARCH FROM ROOT CROPS

[75] Inventor: Petrus Verberne, Hoogezand, Netherlands

[73] Assignee: W. A. Scholten's Chemische Fabrieken B.V. of W. A., Foxhol, Netherlands

[22] Filed: Dec. 22, 1972

[21] Appl. No.: 317,682

[30] Foreign Application Priority Data
Jan. 5, 1972   Netherlands .................. 7200127

[52] U.S. Cl. .................. 99/483; 99/496; 99/516; 99/536; 426/489; 426/518
[51] Int. Cl. .................................. A23l 1/12
[58] Field of Search ............ 99/483, 495, 496, 516, 99/534, 536, 537; 426/489, 495, 518

[56] References Cited
FOREIGN PATENTS OR APPLICATIONS
77,039   1/1955   Netherlands .................. 99/483

Primary Examiner—Stanley N. Gilreath
Attorney, Agent, or Firm—Wenderoth, Lind & Ponack

[57] ABSTRACT

Grated substance of potatoes is separated by means of one or more hydrocyclones into juice and fibers on the one hand and starch on the other. The juice can be recovered in non-diluted or little diluted form while a good starch yield is maintained if the potatoes are grated without adding water in such a manner that the fibres are for the greater part larger than 0.2 mm but do not exceed 1 mm and the supply of each hydrocyclone step individually is kept constant.

12 Claims, 2 Drawing Figures

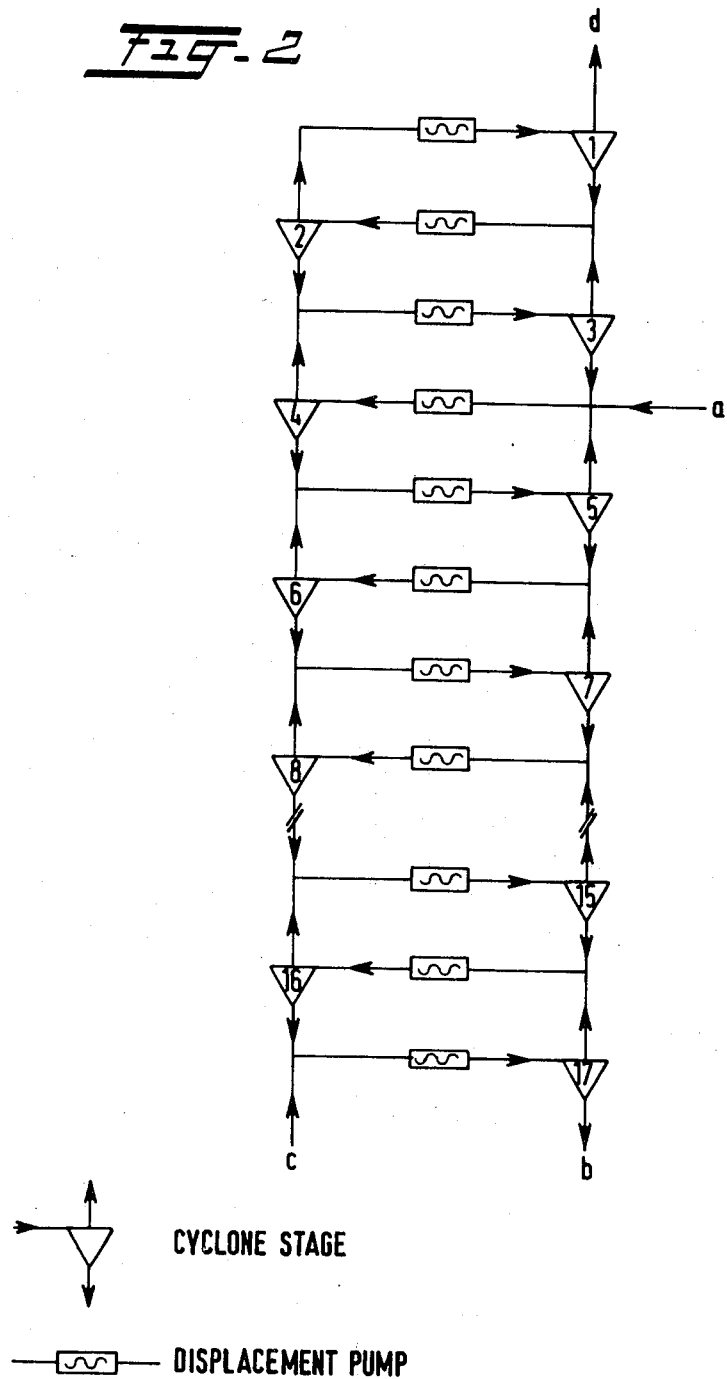

METHOD AND APPARATUS FOR THE RECOVERY OF NON-DILUTED OR LITTLE DILUTED JUICE AND OF STARCH FROM ROOT CROPS

The invention relates to a method of recovering non-diluted or little diluted juice and starch from root crops, such as potatoes, sweet potatoes and cassava tubers, by grating them and treating the grated substance by means of hydrocyclones in a number of separating steps in such a manner that the heavy fraction obtained during the separation in a step $n$, while adding the light fraction obtained during the separation in step $n + 2$, is separated in the step $n + 1$, so that on the one hand a mixture of juice and fibres is obtained and on the other hand a starch suspension. The invention will be described particularly for the use of potatoes as starting material.

Such a method is known from Dutch Pat. No. 77,039. In this prior method for example potatoes, while adding maximally three times the weight amount of water calculated on the original amount of juice, are grated in one time to a particle size of less than 0.17 mm and preferably of less than 0.15 mm. Furthermore, in this prior method, prior to the last separating step, water is added preferably in an amount of at least 0.6 $m^3$ and not exceeding 1 $m^3$ of fresh water per ton of potatoes.

Whereas in the potato starch manufacture grating normally takes place at least twice, wherein the fibre size in the first grated substance is in the order of 0.4 mm, in the method described in Dutch Pat. No. 77,039 it was considered necessary to grate the potatoes in one time to a particle size of less than 0.17 mm to obtain a good starch production and also to avoid clogging of the cyclones. A disadvantage of this method is that the cell walls of the potatoes are ground to such small fibres that the resulting fine fiber is separated less easily from the starch granules in the hydrocyclone separator than with the usual grinding degree and that it is also difficult to sieve them from the overflow of the hydrocyclone plant consisting of juice and fine fiber. Besides, as during grating diluent water is added in the order of 0.4 to 2.4 $m^3$ of water per ton of potatoes and moreover 0.6 to 1 $m^3$ of fresh washing water is supplied before the last separating step, the juice overflowing from the hydrocyclone plan is further diluted to such an extent that the by-products cannot be recovered in an economically justified way. Consequently, the method described in Dutch Pat. No. 77,039 does not provide an acceptable solution to the problem relating to environmental hygiene which the waste water of the potato starch manufacture in the north of the Netherlands forms.

A further disadvantage of the hydrocyclone plant described in Dutch Pat. No. 77,039 is that the plant cannot easily be held in optimum balance. An investigation showed that this is caused by the use of centrifugal pumps without through-flow control. To keep the system in balance the supply conduits of the pumps in the above method are connected via non-return valves to a water conduit. If the vacuum for a pump becomes too high, water will flow from the water conduit via the non-return valve, as a result of which a further dilution of the overflow of the hydrocyclone plant, so of the juice, occurs.

It has now been found that in a separation of the grated substance of potatoes by means of hydrocyclones into juice and fibres on the one hand and starch on the other the juice can be recovered in non-diluted or little diluted form while maintaining a good starch yield if the potatoes are grated without the addition of water such that the fibres are for the greater part larger than 0.2 mm but not larger than 1 mm and the supply of each hydrocyclone step individually is kept constant.

According to the present invention, there is provided a method of recovering non-diluted or little diluted juice and starch from root crops by grating them and treating the grated substance by means of hydrocyclones in a plurality of separating steps in such a manner that the heavy fraction obtained during the separation in step $n$, while adding the light fraction obtained during the separation in step $n + 2$, is separated in the step $n + 1$ in such a manner that on the one hand a mixture of juice and fibres and on the other hand a suspension of starch is obtained, characterized in that the starting material is grated without the addition of water in such a manner that the resulting fibres are predominantly larger than 0.2 mm, but not larger than 1 mm, and the supply of each hydrocyclone step individually is kept constant by means of pumps having an output which is independent of the counter-pressure.

The fibre size in the grated slurry is preferably between 0.4 mm and 0.8 mm. This grinding degree can be obtained by grating the potatoes with conventional drum graters as described for example, in Dutch Pat. 79,771. To prevent discoloration of the grated substance gaseous sulphur dioxide can be added thereto.

The invention also comprises an apparatus for the recovery of nondiluted or little diluted juice and of starch from root crops, including a grinding device and a hydrocyclone plant of such an arrangement that the heavy fraction obtained during the separation in step $n$, while adding the light fraction obtained during the separation in step $n + 2$, is separated in the step $n + 1$, while in the supply conduit of each hydrocyclone step a pump is present, which apparatus is characterized in that the said pumps have an output which is independent of pressure.

As pumps having a pressure-independent output can be used rotary displacement pumps or centrifugal pumps including a flow control. If so desired the hydrocyclone plant may consist of two parts with therebetween a separator plant for separating starch from a liquid and an apparatus in which the separated starch can be suspended in water.

For the recovery of non-diluted or little diluted juice the method according to the invention can be carried out in various ways.

In accordance with one important embodiment the grated substance of the above grinding degree is separated by means of hydrocyclones into non-diluted juice mixed with fibres on the one hand and starch in non-diluted juice on the other. The starch-containing fraction is largely freed from the non-diluted juice present by means of filtration or centrifuging and after suspension in water is subsequently purified in a second hydrocyclone plant by washing in a countercurrent stream of fresh water in an amount which is preferably 0.6 $m^3$ of water per ton of potatoes. By adding the juice separated from the starch to the overflow of the first hydrocyclone plant consisting of non-diluted juice and fibres it is possible, in accordance with this embodiment of the method according to the invention, to recover about 85 percent of the juice present in the potatoes in non-diluted condition, mixed with the fibres.

FIG. 1 is a diagram of part of a starch factory using this system. *a* is the feed conduit through which the pulp is fed in the system consisting of hydrocyclones I, II, III, IV, V, VI and VII connected by closed conduits, provided with rotary displacement pumps or centrifugal pumps with flow control. A suspension of starch in undiluted juice is removed at 1 and undiluted juice and fibres at *g*. The starch is separated from the suspension in the concentrator (by filtration or centrifugation) and made up with water in a suspension tank. The impure starch suspension *j* is then purified in a system consisting of 14 hydrocyclone stages, closed conduits and rotary displacements pumps or centrifugal pumps with flow control. Fresh water is introduced at *c*, whereas a purified starch suspension is removed at *b*. The overflow *k* is partly used for making up the suspension through line *i* and partly discarded through line *d*. The undiluted juice *f* is combined with stream *g* and used for recovery of fibres and protein.

In accordance with another embodiment of the method according to the invention the recovery of the juice with the fibres and the purification of the starch is not effected in two separate hydrocyclone plants, but in one hydrocyclone plant. The top portion of the plant, namely the cyclones between the feed point of the grated substance and the point of overflow, serves as a separator section for starch and fibres and the lowermost portion of the plant, namely the hydrocyclones following the feed hydrocyclone to the tapping point of the purified starch suspension, serves as a washing section for washing the water-soluble substances out of the starch and for removing fine fiber. The amount of fresh washing water fed prior to the last separating step to the hydrocyclone plant is restricted as much as possible in this embodiment, advantageously to less than 0.8 m$^3$ per ton of potatoes, and preferably to less than 0.6 m$^3$ of water per ton of potatoes. In this way all the juice, together with the fibres, is separated in little diluted form. When using less than 0.6 m$^3$ of water per ton of potatoes the protein content of the little diluted juice will be 0.6 time the protein content of the original juice. FIG. 2 is a diagram of a hydrocyclone system for effecting the recovery of the juice with the fibres and the purification of starch according to this embodiment.

The hydrocyclone system consists of the hydrocyclone stages 1–17 connected by closed circuits provided with rotary displacements pumps or centrifugal pumps with flow control. Through the feed conduit *a* the pulp is fed in the system, whereas fresh water is introduced at *c*. Juice with fibres is obtained as the overflow *d*. The purified starch is discharged at *b*.

The recovery of the juice in non-diluted or little diluted form makes an economic processing of the waste water possible. Furthermore it has appeared that the fibres can easily be sieved from the juice. This can be done by means of rotary sieves, sieve pipe bends, centrifuges, separators, decanters and the like. The starch content of the fibres thus obtained is in the order of 40 percent, which is a normal value for potato fibres.

In spite of the small amounts of fresh water used in these embodiments the total protein content in a sufficient number of washing steps of the starch fraction withdrawn from the hydrocyclone plant is less than 0.1 percent. As the starch fraction is also practically free from fine fibre, the starch can be isolated without any further purification by filtration or centrifuging from the starch suspension obtained and be dried to a potato starch of high quality.

The little diluted or non-diluted juice obtained by the various embodiments of the method according to the invention can be processed into by-products in various ways, possibly while removing the free starch, with or without fibres, for example by evaporation and drying, by heat coagulation of the coagulable proteins and separation of the coagulate. It has surprisingly been found that if the heat coagulation which preferably takes place above a temperature of 100°C is performed in the presence of the fibres, the coagulated protein can very easily be filtered off using the fibres as the filtering material. The filtrate of the protein coagulation can inter alia be used as a culture medium for the preparation of single-cell protein by growing yeasts, bacteria or moulds thereon, after which the cultures are separated from the culture medium. If desired fermentation can be so conducted that valuable fermentation products can be obtained, for example in the form of ethanol, butanol and acetone. It is also possible to pass the fibre-free and protein-free waste water over cation and anion exchangers to recover potassium salts or amino acids and organic acids. Besides the filtrate can be concentrated by means of reverse osmosis and/or ultrafiltration and/or evaporation. The concentrates thus obtained can be dried, possibly after the addition of fibres. Furthermore it is possible for the filtrates or possibly waste water effluents from the above processes to be sprayed on land or for them to be subjected to aerobic or anaerobic microbiological purification.

In all these cases purification of the waste water from the manufacture of potato starch to a great extent is simplified and rendered economically more attractive, owing to the fact that in the method according to the invention substantially all the juice is obtained in non-diluted or little diluted form.

The method according to the invention differs from the prior method described above in the fact that the desired values of all flows in the system are maintained, owing to the fact that use is made of pumps having an output which is independent of the counter-pressure, such as rotary displacement pumps or centrifugal pumps with flow control. Thus it is possible to operate with very high starch concentrations in the cyclone effluents without the risk that owing to a change of the flows during the process the concentration in one or more effluents becomes so high that dilatancy takes place and the system becomes jammed. The result of this method is also that the whole system functions under excess pressure. The amount of rinse water to be used in the method according to the invention determines to a high degree the ratio of the effluent and overflow volumes of the hydrocyclone steps, and also the number of hydrocyclone steps in the plant. According as less water is used, more washing steps are necessary for a good washing of the starch.

In the hydrocyclone plant the following conditions can be applied:

Diameter of the cylindrical part of the hydrocyclones: 15 mm.

Pressure drop across the cyclones: about 3 to about 4 bars.

Numbers of hydrocyclone steps in case of:
0.48 m$^3$ of fresh water per ton of potatoes: 19 hydrocyclone steps; 0.56 m$^3$ of fresh water per ton of potatoes:

17 hydrocyclone steps; 0.80 m³ of fresh water per ton of potatoes; 13 hydrocyclone steps.

The proportion of the effluent volumes to the overflow volumes in these steps varies from 27 to 50 percent effluent to 73 to 50 percent overflow. The effluents of the majority of the hydrocyclone steps in the washing section contain at least 450 grams of absolutely dry substance starch per litre.

The invention, which can also be applied for recovering undiluted or little diluted fruit juice and starch from sweet potatoes or cassava tubers will be elucidated in and by the following examples and with reference to the accompanying drawings.

EXAMPLE I

FIG. 1 shows a double hydrocyclone plant which serves in the first instance to remove the majority of the juice in non-diluted condition. In this instance, in the first plant comprising 7 hydrocyclone steps no fresh water is supplied; in the second plant water is supplied. In this method a good 17 tons of potatoes per hour are grated, without the addition of water, to a fibre size predominantly ranging between 0.4 and 0.8 mm, and are supplied by means of a rotary displacement pump to multihydrocyclone step IV of the first plant (a). These 17 tons of potatoes per hour correspond with 4.74 kg/sec, or about 5.3 litres of grated substance per second, in which 948 grams of free starch is contained. The ratio of the effluent and overflow volumes of this step and all the other steps of this first plant is adjusted to 50 : 50.

The overflow $g$ in the plant consists of 2.7 litres of juice, in which practically all the fibres, and also about 2 grams of free starch are suspended. The effluent 1 of the first hydrocyclone plant comprises practically all the starch that can be recovered and a small amount of fine fibre suspended in juice. Because of the fact that substantially no fibres are present therein this effluent can easily be dewatered by means of a vacuum filter or centrifuge (CON). The juice $f$ recovered thereby is added to the overflow $g$, so that the combined stream (3.3 litres per sec) consists of a good 85 percent of the original juice in non-diluted form plus the fibres. The stream $e$ is acidified with hydrochloric acid to pH = 4 and then supplied to a heat-exchanger which comprises a tube bank heated with steam, the temperature of the stream being raised to 105°C. Through this the heat-coagulable protein precipitates. There is no appreciable contamination in the heat-exchanger. After cooling, the precipitate consisting of protein and fibres is separated in a cloth centrifuge. Dewatering takes place very well, so a filter cake with about 16 percent dry substance is obtained. After drying a protein-rich fibre is obtained which contains about 40 percent protein and about 26 percent starch.

The starch fraction $h$, 1.44 kg/sec consisting of 946 grams of commercially dry starch plus fine fibre and the remaining juice are suspended in 3.30 litres/sec (i) of the overflow fraction of the second hydrocyclone tower.

This suspension is added as stream $j$ to multihydrocyclone step 4 of the second plant comprising 14 hydrocyclone steps. The setting of the effluent and overflow volumes in this plant is as follows:
multihydrocyclone step 1-3, 33 : 67
multihydrocyclone step 4, 50 : 50
multihydrocyclone step 5-8, 33 : 67
multihydrocyclone step 9-13, 40 : 60
multihydrocyclone step 14, 35 : 65

At $c$ 2.64 litres of fresh water per second are added to wash the starch under countercurrent conditions, corresponding with 0.56 m³ of water per ton of potatoes. As effluent $b$ 1.64 litres per second of a starch suspension of about 22.5° Be is obtained. After drying and filtering 945 grams of potato starch with 20 percent moisture and 0.08 percent total protein of superior quality is recovered.

EXAMPLE II

FIG. 2 shows multihydrocyclones 1-17 having the following dimensions:

| | |
|---|---|
| diameter cylindrical portion | 15 mm |
| diameter overflow opening | 3.5 mm |
| diameter effluent opening | 3.5 mm |
| apex angle | 10° |

Each step is fed with a rotary displacement pump.

The grated potato mass $a$ is supplied to multihydrocyclone 4, the ratio of effluent and overflow volumes being set at 50 : 50.

The ratio of effluent and overflow volumes of the multihydrocyclones 1-3 and 5-8 is set at 33 : 67, for multihydrocyclones 9-16 at 40 : 60 and for multihydrocyclone 17 at 35 : 65.

The starch suspension is tapped from cyclone 17 at $b$. Fresh rinse water is supplied to cyclone 17 at $c$.

In a potato starch producing plant shown in FIG. 2 potatoes are grated by means of a drum grater provided with a sieve with openings of 20 × 2 mm. The fibre size ranges predominantly between 0.4 and 0.8 mm. The potatoes contain 200 grams of recoverable commercially dry potato starch (80 percent dry substance) per kg.

Per hour a good 17 tons of potatoes are grated corresponding with 4.74 kg of potatoes per second. This quantity produces about 5.3 litres of grated substance/sec in which 948 grams of free, commercially dry starch is contained.

At $c$ 2.6 litres of fresh effluent water per second are supplied corresponding with 0.56 m³ of water per ton. As 1.6 litres per second of a starch suspension of about 22.5° Be (460 grams absolutely dry substance starch per litre) are obtained. After filtering and drying 926 grams of potato starch with 20 percent moisture and 0.08% total protein is recovered from this. A sample of this starch contains after hydrolysis with diluted hydrochloric acid very little insoluble material and is of superior quality. Per second about 6.3 litres of overflow $d$ are obtained. These 6.3 litres have a dry content of insolubles comprising 22 grams of free starch and 120 grams of fibre (contains 40 percent bonded starch). The protein content of the overflow is about 0.7 time the protein content of the original juice. The overflow $d$ is or is not stripped of the solid substances suspended therein and processed to prepare protein and/or protein-rich fibre.

I claim:

1. A method of recovering starch and slightly diluted juice from root crops, comprising the steps of grating tubers, without the addition of water, to a pulp in which the fibers are predominantly larger than 0.2 mm but not larger than 1 mm, feeding the pulp into at least the 4th hydrocyclone stage of a countercurrent hydrocyclone system containing at least 13 hydrocyclone stages each having a supply pump which is independent of counterpressure connected thereto, all hydrocyclone stages other than the first and final having the discharge conduit connected to the supply pump of the next succeeding stage and the overflow conduit connected to the supply pump of the next preceding stage, feeding countercurrently into the final hydrocyclone stage fresh water in an amount of up to 0.8 m$^3$ per metric ton of tubers, and withdrawing from the final hydrocyclone stage a substantially pure starch fraction and withdrawing from the overflow of the first stage a fraction consisting of slightly diluted juice containing fibers.

2. The method as claimed in claim 1 in which up to 0.6 m$^3$ of fresh water per metric ton of tubers is fed.

3. The method as claimed in claim 1 in which the step of grating the tubers comprises grabing them for producing fibers which are predominantly between 0.4 and 0.8 mm in size.

4. The method as claimed in claim 1 further comprising thermally treating the juice and fibers withdrawn from the first hydrocyclone stage and subsequently separating and drying the resulting protein-rich fiber.

5. A method of recovering starch and slightly diluted juice from root crops, comprising the steps of grating tubers, without the addition of water, to a pulp in which the fibers are predominantly larger than 0.2 mm but not larger than 1 mm, feeding the pulp into at least the 4th hydrocyclone stage of a first countercurrent hydrocyclone system containing at least 7 hydrocyclone stages each having a supply pump which is independent of counterpressure connected thereto, all hydrocyclone stages other then the first and final having the discharge conduit connected to the supply pump of the next succeeding stage and the overflow conduit connected to the supply pump of the next preceding stage, withdrawing from the final hydrocyclone stage a suspension of starch in undiluted juice, separating the juice and the starch, suspending the separated starch in water, feeding the suspension of starch in water into at least the 4th hydrocyclone stage of a second countercurrent hydrocyclone system containing at least 13 hydrocyclone stages each having a supply pump and being connected in the same manner as the stages of the first hydrocyclone system, feeding countercurrently into the final hydrocyclone stage of said second hydrocyclone system fresh water in an amount of up to 0.8 m$^3$ per metric ton of tubers, withdrawing from the final hydrocyclone stage of said second hydrocyclone system a substantially pure starch fraction, and withdrawing from the overflow of the first stage of the first hydrocyclone system undiluted juice containing fibers.

6. The method as claimed in claim 5 in which up to 0.6 m$^3$ of fresh water per metric ton of tubers is fed.

7. The method as claimed in claim 5 in which the step of grating the tubers comprises grating them for producing fibers which are predominantly between 0.4 and 0.8 mm in size.

8. The method as claimed in claim 5 further comprising the step of withdrawing from the overflow of the first hydrocyclone stage of said second hydrocyclone system dilute juice and fiber and mixing said withdrawn dilute juice and fiber with the starch separated from the undiluted juice.

9. The method as claimed in claim 5 further comprising thermally treating the juice and fibers withdrawn from the first hydrocyclone stage of said first hydrocyclone system and subsequently separating and drying the resulting protein-rich fiber.

10. An apparatus for effecting the recovery of starch and slightly diluted juice from pulp obtained by grating root crops, consisting of a hydrocyclone system containing at least 13 hydrocyclone stages each having a supply pump which is independent of counterpressure connected thereto, all hydrocyclone stages other than the first and final having the discharge conduit connected to the supply pump of the next succeeding hydrocyclone stage and the over flow conduit connected to the supply pump of the next preceding hydrocyclone stage, a conduit through which the pulp is fed in the hydrocyclone system, being connected to a hydrocyclone stage positioned at least in stage 4, the overflow conduit of the first hydrocyclone being an outlet for the slightly diluted juice, the discharge conduit of the final hydrocyclone stage being an outlet for a concentrated starch suspension, and the supply pump of the final hydrocyclone stage being connected with a fresh water supply conduit.

11. An apparatus for effecting the recovery of starch and slightly diluted juice from pulp obtained by grating root crops, comprising a first hydrocyclone system having at least 7 hydrocyclone stages each having a supply pump which is independent of counterpressure connected thereto, all hydrocyclone stages other than the first and final having the discharge conduit connected to the supply pump of the next succeeding stage hydrocyclone stage and the overflow conduit connected to the supply pump of the next preceding hydrocyclone stage, a pulp feed conduit connected to the hydrocyclone stage positioned at least in stage 4, the overflow conduit of the first hydrocyclone stage being an outlet for undiluted juice and pulp, starch and juice separating means connected to the discharge conduit of the final stage, a suspension preparing means connected to said separating means for receiving separated starch therefrom and forming a suspension of starch in a liquid, a second hydrocyclone system having at least 13 stages each having a supply pump and being connected in the same manner as the stages of said first hydrocyclone system, an inlet conduit from said suspension preparing means to the supply pump for at least the 4th stage of said second hydrocyclone system, the discharge conduit of the final hydrocyclone stage of said second hydrocyclone system being an outlet for a concentrated starch suspension, and the supply pump of the final hydrocyclone stage being connected with a fresh water supply conduit.

12. An apparatus as claimed in claim 11 in which an undiluted juice conduit is connected between said separating means and the overflow of the first hydrocyclone stage of said first hydrocyclone system, and a diluted juice conduit extends from the overflow of the first hydrocyclone stage of said second hydrocyclone system to said suspension preparing means for supplying diluted juice as the liquid for said suspension.

* * * * *